United States Patent
Meftah et al.

(10) Patent No.: US 9,779,551 B2
(45) Date of Patent: Oct. 3, 2017

(54) METHOD FOR GENERATING A CONTENT IN AUGMENTED REALITY MODE

(71) Applicant: SCHNEIDER ELECTRIC INDUSTRIES SAS, Rueil Malmaison (FR)

(72) Inventors: Tewfik Meftah, Grenoble (FR); Benoit Jacquemin, Saint Ismier (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 67 days.

(21) Appl. No.: 14/665,143

(22) Filed: Mar. 23, 2015

(65) Prior Publication Data

US 2015/0279112 A1    Oct. 1, 2015

(30) Foreign Application Priority Data

Mar. 26, 2014    (FR) ...................................... 14 52555

(51) Int. Cl.
*G06K 7/10*    (2006.01)
*G06K 9/18*    (2006.01)
(Continued)

(52) U.S. Cl.
CPC .......... *G06T 19/006* (2013.01); *G06F 3/0488* (2013.01); *G06K 7/10366* (2013.01);
(Continued)

(58) Field of Classification Search
CPC .... G06F 3/0488; G06K 7/10366; G06K 9/18; G06Q 10/08; G06T 19/006; G06T 1/60
See application file for complete search history.

(56) References Cited

U.S. PATENT DOCUMENTS

2005/0149231 A1*  7/2005  Pretlove ................. B25J 9/1671
                                                                            700/264
2012/0026530 A1    2/2012  Tsongas et al.
(Continued)

FOREIGN PATENT DOCUMENTS

FR            2 987 924 A1    9/2013

OTHER PUBLICATIONS

French Preliminary Search Report and Written Opinion issued Jan. 30, 2015, in Patent Application No. FR 1452555, filed Mar. 26, 2014 (with English Translation of Category of Cited Documents).

*Primary Examiner* — Sing-Wai Wu
(74) *Attorney, Agent, or Firm* — Oblon, McClelland, Maier & Neustadt, L.L.P.

(57) ABSTRACT

The invention relates to a method for generating content in augmented reality mode for an equipment item (E) situated in the real world, by employing a mobile terminal (1) provided with a screen (11), the method comprising:
  a step of determining an augmented reality database stored in an augmented reality server (S1),
  a step of reading, using the mobile terminal, a matrix code (20) or an electronic tag associated with said equipment item (E), said matrix code (20) or said electronic tag respectively coding or comprising an address linked to a content,
  a step of memorizing said address,
  a step of generating a graphical interface component (Wx) corresponding to said address allowing access to said content,
  a step of memorizing the graphical interface component (Wx) in the database (DB) stored in the augmented reality server (S1).

10 Claims, 3 Drawing Sheets

(51) Int. Cl.
  *G06T 19/00*    (2011.01)
  *G06T 1/60*     (2006.01)
  *G06F 3/0488*   (2013.01)
  *G06Q 10/08*    (2012.01)

(52) U.S. Cl.
  CPC ............... *G06K 9/18* (2013.01); *G06Q 10/08* (2013.01); *G06T 1/60* (2013.01)

(56) References Cited

U.S. PATENT DOCUMENTS

| | | | |
|---|---|---|---|
| 2012/0038671 A1* | 2/2012 | Min | G06T 19/00 345/633 |
| 2012/0181330 A1 | 7/2012 | Kim | |
| 2012/0263154 A1* | 10/2012 | Blanchflower | G06F 17/30247 370/338 |
| 2014/0051513 A1* | 2/2014 | Polo | A63F 13/00 463/31 |
| 2014/0168262 A1* | 6/2014 | Forutanpour | G06T 19/006 345/633 |

* cited by examiner

METHOD FOR GENERATING A CONTENT IN AUGMENTED REALITY MODE

TECHNICAL FIELD OF THE INVENTION

The present invention relates to a method for generating a content in augmented reality mode for an equipment item situated in the real world.

STATE OF THE ART

It is known practice to apply matrix codes or electronic tags to an equipment item. Using a mobile terminal, an operator can scan this matrix code which is then decoded, or read the electronic tag. The decoded or memorized address then refers to a content associated with the equipment item. This content is stored on a remote server to which the mobile terminal connects for access thereto. The access to the content linked to the matrix code or to the electronic tag is not always easy. The main reason lies in the fact that the matrix code or the electronic tag can be read by the mobile terminal only at a very short distance, requiring the equipment item to be accessible. Now, this is not always the case, for example when the equipment item is housed in a cabinet.

The documents US2012/0181330 and US2012/026530 describe solutions for associating a personalized message with a matrix code. However, the messages that are thus created are not made available in augmented reality mode.

The aim of the invention is to propose a method that enables the user to access the content linked to the matrix code or to the electronic tag, even if the latter is not easily accessible.

EXPLANATION OF THE INVENTION

This aim is achieved by a method for generating content in augmented reality mode for an equipment item situated in the real world, by employing a mobile terminal provided with a screen, the method comprising:
- a step of determining an augmented reality database stored in an augmented reality server,
- a step of reading, using the mobile terminal, a matrix code or an electronic tag associated with said equipment item, said matrix code or said electronic tag respectively coding or comprising an address linked to a content,
- a step of memorizing said address,
- a step of generating a graphical interface component corresponding to said address allowing access to said content and that can be selected in augmented reality mode on an image of the equipment item to access said content,
- a step of memorizing the graphical interface component in the database stored in the augmented reality server.

According to a particular feature, the matrix code is a QR code or equivalent.

According to another particular feature, the electronic tag is of NFC or RFID type.

According to another particular feature, the method comprises a step of associating the graphical interface component with the equipment item or with a marker placed in the vicinity of the equipment item.

According to another particular feature, the step of associating the graphical interface component with the equipment item is performed by moving the graphical interface component displayed in augmented reality mode on the screen of the mobile terminal over an image of the equipment item displayed on the screen of the mobile terminal or in a geographic reference frame.

According to another particular feature, the graphical interface component consists of a text or of a symbol.

The invention relates also to a system for generating content in augmented reality mode for an equipment item situated in the real world, this equipment item comprising:
- a module for determining an augmented reality database stored in an augmented reality server,
- a module for reading a matrix code or an electronic tag associated with said equipment item, said matrix code or said electronic tag respectively coding or comprising an address linked to a content, said electronic tag being associated with a content,
- a module for memorizing said address,
- a module for generating a graphical interface component corresponding to said address allowing access to said content,
- a module for memorizing the graphical interface component in the database stored in the augmented reality server.

According to a particular feature, the matrix code is a QR code or equivalent.

According to another particular feature, the system comprises a module for associating the graphical interface component with the equipment item.

According to another particular feature, the module for associating the graphical interface component with the equipment item is arranged to make it possible to slide the graphical interface component displayed in augmented reality mode on the screen of the mobile terminal over an image of the equipment item displayed on the screen of the mobile terminal.

According to another particular feature, the graphical interface component consists of a text or of a symbol.

BRIEF DESCRIPTION OF THE FIGURES

Other features and advantages will become apparent from the following detailed description, given in light of the attached drawings in which.

DETAILED DESCRIPTION OF AT LEAST ONE EMBODIMENT

The invention relates to a method for generating a content in augmented reality mode.

Hereinafter in the description, it will be considered that an equipment item E can be a device on its own or a machine on its own or a set of devices or machines. The term equipment item should not therefore be considered to be limiting.

Figure 1:
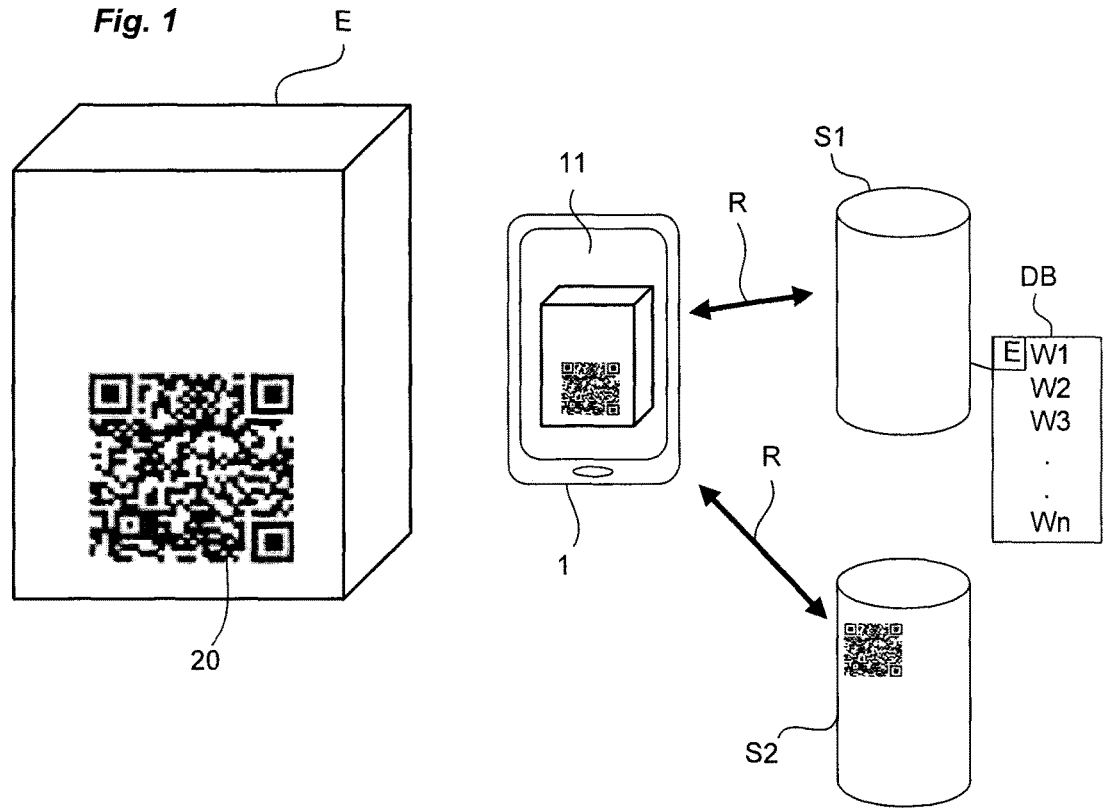
FIG. 1 represents a system employed to implement the method of the invention.

Referring to FIG. 1, the system making it possible to implement the method of the invention notably employs a mobile terminal 1 as defined hereinbelow.

Hereinafter in the description, the term "mobile terminal" 1 should be understood to mean an electronic apparatus of mobile telephone or touch tablet type provided with a screen 11. It may also be spectacles in which each lens is replaced by a screen. The mobile terminal is provided with a camera and/or video apparatus for filming the objects situated in the real world and displaying the corresponding images on the screen 11 of the mobile terminal. The screen 11 of the mobile terminal 1 will, for example, be of touch type. The mobile terminal 1 further comprises processing means, storage means and one or more communication interfaces enabling it to dialogue over different wired and/or wireless communication networks.

Hereinafter in the description, the term "graphical interface component" W1-Wn (hereinafter generally denoted W) should be understood to mean a component of "widget" type that comes to be overlaid in augmented reality mode on the screen 11 of the mobile terminal 1 in the image of the equipment item E displayed on the screen 11. The graphical interface component W for example takes the form of an icon or of a pop-up menu making it possible to access a content linked to the equipment item aimed at in the real world. This content will, for example, be stored locally on the mobile terminal 1 or on a remote augmented reality server S1 that can be accessed through a communication network R. Hereinafter in the description, interest will be focussed on a system which preferentially comprises a mobile terminal and an augmented reality server S1 communicating with said mobile terminal through a communication network. However, it should be understood that the mobile terminal could perfectly well carry out locally, that is to say offline, the processing and the determining of the graphical interface components to be displayed and the storage in its storage means of the contents linked to each identified graphical interface component.

Hereinafter in the description, the term "image" will be understood to mean a fixed image taken using a camera apparatus or a video stream comprising a plurality of successive images captured using a video camera.

The display of a graphical interface component W in augmented reality mode is produced by launching a specific application on the mobile terminal 1. This specific application is arranged to connect the mobile terminal 1 to the remote augmented reality server S1 employed to identify the graphical interface components W to be displayed on the screen 11 of the mobile terminal 1. The augmented reality server S1 stores an augmented reality database DB in which are stored the graphical interface components W associated with each equipment item E or with the position and the orientation of the mobile terminal 1 in its environment, and the contents associated with each of these components. The identification of the equipment item E can be produced in different ways. The mobile terminal 1 can, for example, send a request containing the image captured using its camera and/or video apparatus to the remote server S1 in order for the latter to identify each equipment item E represented on the image and return, in response, each graphical interface component W. In the other variant embodiment, the mobile terminal 1 sends, in the request, its geographic coordinates and its orientation and the server S1 determines, from these data, the graphical interface components W to be displayed. The geographic position and the orientation of the mobile terminal 1 relative to the targeted equipment items can be obtained in known ways, for example by using chips present in the mobile terminal 1 and/or by employing triangulation solutions using external sensors.

Moreover, a matrix code 20 or an electronic tag can be applied to the equipment item E. In the attached figures, the example of a matrix code has been taken, but it should be understood that it can be an electronic tag. This matrix code 20 or this electronic tag is read by the user, for example using his or her mobile terminal 1 by executing a dedicated software application. Generally, this matrix code 20 or this electronic tag contains an address that refers also to a content stored on the equipment item itself or on a remote server S2 to which the mobile terminal 1 connects. In the latter case, the connection is, for example, made via the wireless communication network R of 3G, 4G, or WIFI type or any other known solution.

The invention will enable the user to access the content linked to the matrix code 20 or to the electronic tag, even if, for different reasons, the matrix code 20 or the electronic tag is difficult to access.

The invention thus consists in converting the matrix code 30 or the electronic tag into a graphical interface component W available in augmented reality mode on the screen 11 of the mobile terminal 1 of the user.

More specifically, the method of the invention is implemented by executing, on the mobile terminal 1 of the user, a software application intended to perform this conversion. The software application comprises a plurality of software modules executed by the processing means of the mobile terminal 1.

Figure 2A:
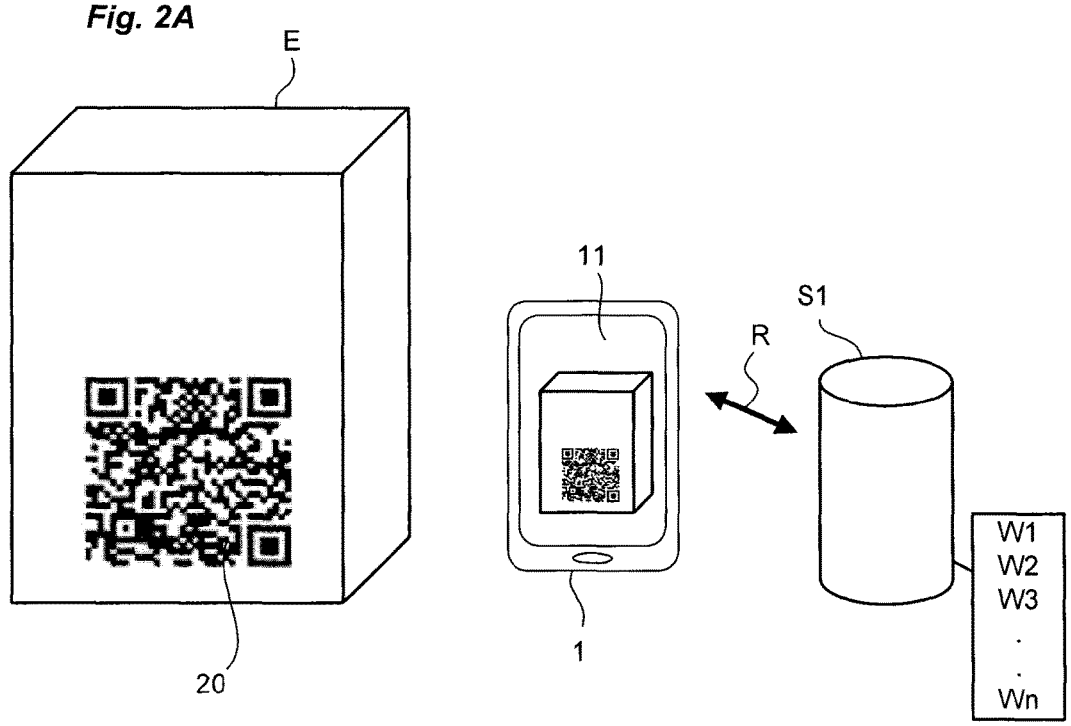
FIGS. 2A to 2D schematically illustrate the various steps of the method of the invention.

The method thus comprises:
- A step of determining an augmented reality database DB associated with the equipment item E, this determining step being able to be implemented by recognition of the equipment item E situated in the real world using the mobile terminal 1 (FIG. 2A) or by determining the geographic position and the orientation of the mobile terminal 1 in its environment.

Figure 2B:
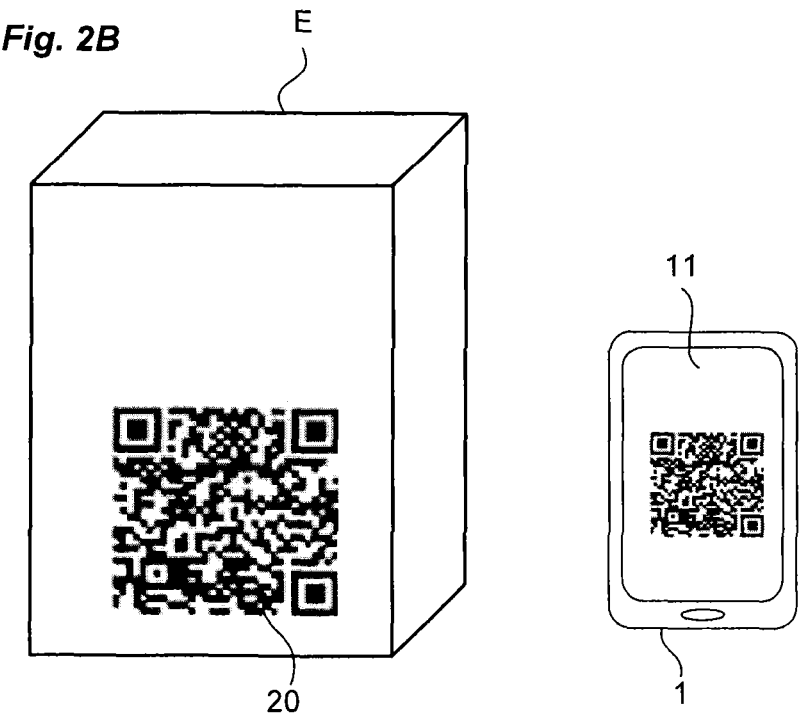

This step is implemented by a determination module responsible for ordering a request to be sent to the augmented reality server S1. As specified above, the request contains data making it possible to identify the equipment item E or the position and the orientation of the mobile terminal 1 relative to the equipment item. In the former case, it can be, for example, a photo of the equipment item taken by the user using the camera and/or video apparatus.
- A step of reading, using the mobile terminal, the matrix code 20 or an electronic tag associated with the equipment item and of memorizing the address linked to the matrix code or to the electronic tag (FIG. 2B).

This matrix code 20 or this electronic tag is, for example, applied to the equipment item E and is associated with a content. This content is, for example, memorized on the remote server S2 or on the equipment item E itself. In FIG. 2B, the matrix code 20 or the electronic tag respectively codes or memorizes an address referring to said content stored on the remote server S2 accessible via the communication network R. The reading of the matrix code 20 or of the electronic tag is performed using a reading module. The reading module controls the camera and/or video apparatus of the mobile terminal if it is a matrix code or an appropriate reader, for example a reader of NFC (Near Field Communication) type incorporated in the mobile terminal or of RFID (Radio Frequency Identification) type if it is an electronic tag. A storage module stores the address read in the matrix code 20 or the electronic tag.
- A step of generating a new graphical interface component that can be activated to access said content.

Figure 2C:
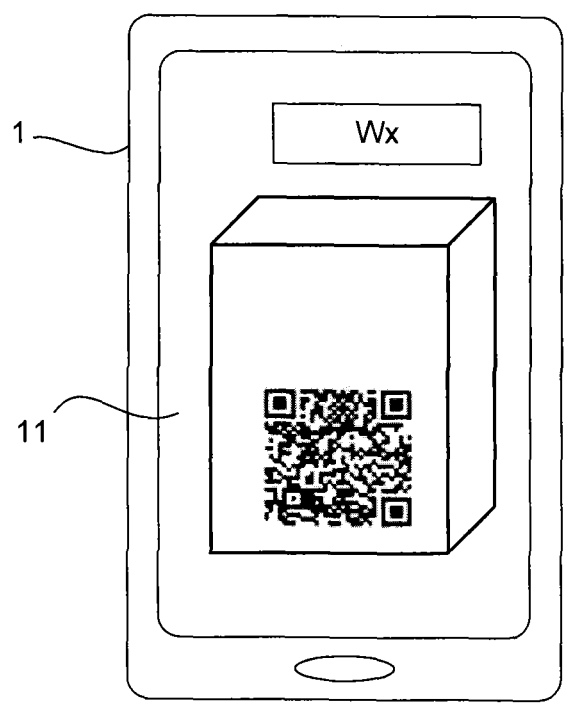

During this step, a generation module of the software application recovers the address memorized and generates a specific graphical interface component Wx for the latter. This graphical interface component Wx can be, for example, a symbol or a text, possibly including several levels of detail.
- A step of associating the new graphical interface component Wx with the equipment item E (FIG. 2C), with a marker placed in the vicinity of the equipment item and that can be recognized from far away or in a geographic reference frame.

A module of the software application enables the user to associate the graphical interface component Wx generated with the equipment item E or with a recognizable specific marker. For this, the association module makes it possible, for example, for the user to move the graphical interface component Wx generated on the screen 11 of the mobile terminal 1 to stick it onto the fixed or moving image of the equipment item E or onto a marker displayed on said screen 11, or to position it in a geographic reference frame. The software application then performs the association and then launches a module for memorizing this association.

Figure 2D:
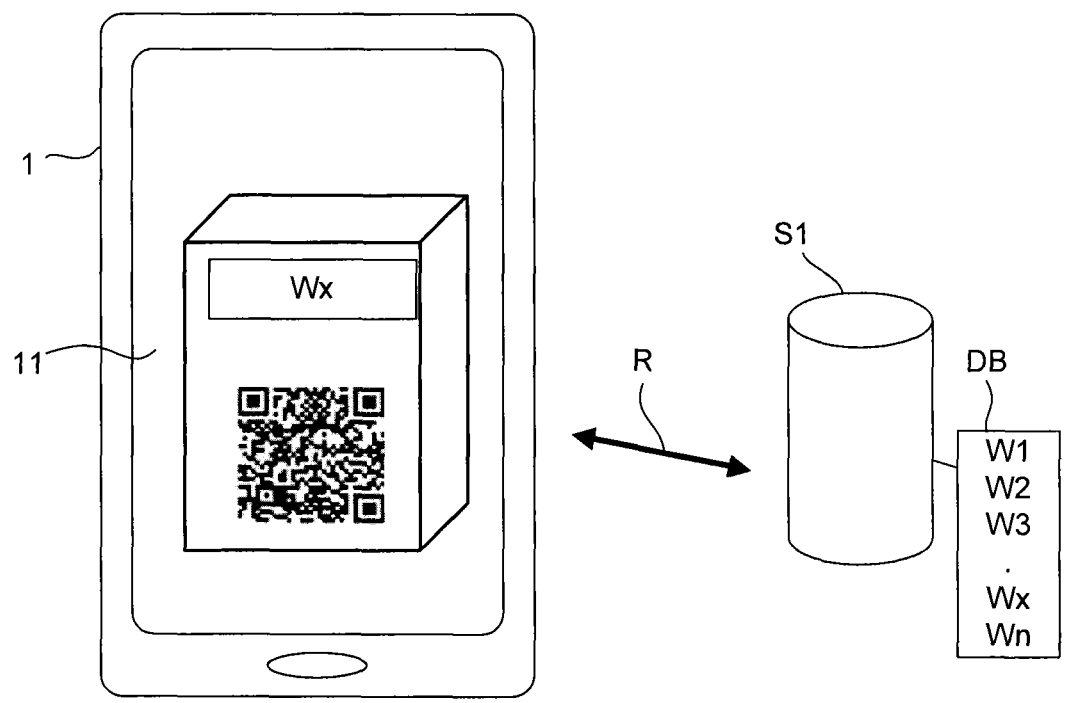

Memorizing the graphical interface component Wx in conjunction with said equipment item E or with the position and the orientation of the mobile terminal 1 in the database DB stored in the augmented reality server S2 (FIG. 2D).

During this step, the storage module of the software application is responsible for updating the database DB stored in the augmented reality server S1. The new graphical interface component Wx generated, corresponding to the address encoded in the matrix code or stored in the electronic tag, is thus added to the database of the augmented reality server for the selected equipment item E. It is then added to the image of the equipment item displayed on the screen of a mobile terminal and can be selected on the screen of the mobile terminal. Then, the graphical interface component generated will be able to be made visible in augmented reality mode on the screen of any mobile terminal targeting the equipment item E. It will no longer be necessary to scan the matrix code associated with the equipment item E. This will make it possible to access the content linked to the equipment item, notably if the matrix code is not easily accessible to be scanned.

The matrix code will, for example, be able to be a QR code (Quick Response Code) or another known type of two-dimensional code.

The electronic tag will, for example, be a tag of NFC (Near Field Communication) or of RFID (Radio Frequency Identification) type.

The invention thus makes it possible to make it easy to access the content linked to the matrix code 20 or to an electronic tag present on an equipment item, without needing direct access thereto. The user can thus view the content linked to the matrix code 20 or to the electronic tag by selecting the graphical interface component Wx that appears in augmented reality mode on the screen 11 of his or her mobile terminal 1 when the latter aims at the equipment item E.

The invention claimed is:

1. A method for generating content in an augmented reality mode for an equipment item situated in the real world, by employing a mobile terminal provided with a screen, comprising:
   determining an augmented reality database stored in an augmented reality server;
   reading, using the mobile terminal, a matrix code or an electronic tag associated with said equipment item, said matrix code or said electronic tag respectively comprising an address linked to a content;
   memorizing said address;
   generating a graphical interface component corresponding to said address to allow selection, on a screen of the mobile terminal, of said content in the augmented reality mode on an image of the equipment item to access said content;
   receiving, in the augmented reality mode, user input to move the graphical interface component relative to said equipment item in the image;
   creating, in the augmented reality mode, an association between the graphical interface component and said equipment item based on a location of the graphical interface component relative to the equipment item in the image; and
   memorizing the association between the graphical interface component and the equipment item in the augmented reality database stored in the augmented reality server,
   wherein the user input to move the graphical interface component relative to the equipment item is received via a touch screen of the mobile terminal, and a position of the graphical interface component is determined based on a geographic reference frame.

2. The method according to claim 1, wherein the matrix code is a Quick Response (QR) code or equivalent.

3. The method according to claim 1, wherein the electronic tag is of a Near Field Communication (NFC) or a Radio Frequency Identification (RFID) type.

4. The method according to claim 1, wherein the graphical interface component includes a text or a symbol.

5. The method according to claim 1, wherein the graphical interface component includes a pop-up menu.

6. The method according to claim 5, wherein the graphical interface component includes a plurality of levels of detail.

7. A system for generating content in an augmented reality mode for an equipment item situated in the real world, comprising:
   a processor configured to
      determine an augmented reality database stored in an augmented reality server;
      read a matrix code or an electronic tag associated with said equipment item, said matrix code or said electronic tag respectively comprising an address linked to a content, said electronic tag being associated with a content;
      memorize said address;
      generate a graphical interface component corresponding to said address to allow selection, on a screen of the system, of said content in the augmented reality mode on an image of the equipment item to access said content;
      receive, in the augmented reality mode, user input to move the graphical interface component relative to said equipment item in the image;
      create, in the augmented reality mode, an association between the graphical interface component and said equipment item based on a location of the graphical interface component relative to the equipment item in the image; and
      memorize the association between the graphical interface component and the equipment item in the augmented reality database stored in the augmented reality server,
      wherein the user input to move the graphical interface component relative to the equipment item is determined based on a geographic reference frame.

8. The system according to claim 7, wherein the matrix code is a Quick Response (QR) code or equivalent.

9. The system according to claim 7, wherein the electronic tag is of a Near Field Communication (NFC) or a Radio Frequency Identification (RFID) type.

10. The system according to claim 7, wherein the graphical interface component includes a text or a symbol.

\* \* \* \* \*